United States Patent
Leitner et al.

(10) Patent No.: US 10,240,027 B2
(45) Date of Patent: Mar. 26, 2019

(54) INDOLINE-NITROXIDE RADICAL AS STABILIZER AND INHIBITOR FOR REACTIVE RESINS, REACTIVE RESINS CONTAINING SAME AND USE OF SAME

(71) Applicant: Hilti Aktiengesellschaft, Schaan (LI)

(72) Inventors: Michael Leitner, Landsberg (DE); Armin Pfeil, Kaufering (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 16/000,754

(22) Filed: Jun. 5, 2018

(65) Prior Publication Data

US 2018/0282517 A1    Oct. 4, 2018

Related U.S. Application Data

(62) Division of application No. 14/395,357, filed as application No. PCT/EP2013/057429 on Apr. 10, 2013, now abandoned.

(30) Foreign Application Priority Data

Apr. 20, 2012   (DE) ................. 10 2012 206 554

(51) Int. Cl.
   *C08K 5/3417*   (2006.01)
   *C08K 3/01*     (2018.01)
   *C08K 3/36*     (2006.01)
   *C04B 26/16*    (2006.01)
   *C04B 14/06*    (2006.01)
   *C04B 26/06*    (2006.01)
   *C04B 40/06*    (2006.01)
   *C08J 3/24*     (2006.01)
   *C04B 111/00*   (2006.01)

(52) U.S. Cl.
   CPC ............ *C08K 5/3417* (2013.01); *C04B 14/06* (2013.01); *C04B 26/06* (2013.01); *C04B 26/16* (2013.01); *C04B 40/065* (2013.01); *C08J 3/24* (2013.01); *C08J 3/241* (2013.01); *C08K 3/01* (2018.01); *C08K 3/36* (2013.01); *C04B 2111/00086* (2013.01); *C04B 2111/00663* (2013.01); *C04B 2111/00715* (2013.01); *Y10T 428/13* (2015.01); *Y10T 428/1345* (2015.01)

(58) Field of Classification Search
   CPC .......... C08K 5/3417; C08K 3/01; C08K 3/36; Y10T 428/1345; Y10T 428/13; C04B 26/16; C04B 14/06; C04B 26/06; C04B 40/065; C08J 3/24; C08J 3/241
   See application file for complete search history.

(56) References Cited

U.S. PATENT DOCUMENTS

| 3,297,745 | A | 1/1967 | Fekete et al. |
| 3,772,404 | A | 11/1973 | Knight et al. |
| 4,618,658 | A | 10/1986 | Hefner, Jr. et al. |
| 5,346,545 | A | 9/1994 | Chassot |
| 5,531,546 | A | 7/1996 | Herdlicka et al. |
| 5,854,305 | A | 12/1998 | Schwiegk et al. |
| 7,049,355 | B2 | 5/2006 | Quis et al. |
| 7,807,740 | B2 | 10/2010 | Kumru et al. |
| 2001/0041774 | A1* | 11/2001 | Minaux ............ C08F 4/00 526/64 |
| 2002/0002259 | A1 | 1/2002 | Quis et al. |
| 2003/0149204 | A1 | 8/2003 | Minaux et al. |
| 2008/0171807 | A1 | 7/2008 | Kumru et al. |
| 2008/0274074 | A1 | 11/2008 | Couturier et al. |
| 2012/0270961 | A1* | 10/2012 | Kotani ............ C08F 2/48 522/18 |

FOREIGN PATENT DOCUMENTS

| DE | 37 44 390 A1 | 7/1989 |
| DE | 39 40 309 A1 | 6/1991 |
| DE | 41 31 457 A1 | 3/1993 |
| DE | 42 31 161 A1 | 3/1994 |
| DE | 195 31 649 A1 | 3/1997 |
| EP | 0 559 613 A1 | 9/1993 |
| EP | 0 965 619 A1 | 12/1999 |
| EP | 1 120 430 A1 | 8/2001 |
| EP | 1 935 860 A2 | 6/2008 |
| GB | 2 217 722 A | 11/1989 |
| WO | WO 02/028946 A1 | 4/2002 |
| WO | WO 02/051903 A1 | 7/2002 |
| WO | WO 2010/108939 A1 | 9/2010 |

OTHER PUBLICATIONS

International Search Report (PCT/ISA/210) dated Jun. 24, 2013 with English translation (Four (4) pages).

\* cited by examiner

*Primary Examiner* — Robert D. Harlan
(74) *Attorney, Agent, or Firm* — Grüneberg and Myers PLLC

(57) ABSTRACT

Use of a stable indole-nitroxide radical as a stabilizer and/or inhibitor for resin mixtures and reactive resin mortars is described on the basis of radically curable compounds. Resin mixtures and reactive resin mortars may be made stable in storage very effectively using the indole nitroxide radical and the pot life of mortar compositions can be adjusted in a targeted manner.

6 Claims, No Drawings

INDOLINE-NITROXIDE RADICAL AS STABILIZER AND INHIBITOR FOR REACTIVE RESINS, REACTIVE RESINS CONTAINING SAME AND USE OF SAME

This application is a divisional of U.S. application Ser. No. 14/395,357, filed Oct. 17, 2014, which claims the priority of International Application No. PCT/EP2013/057429, filed Apr. 10, 2013, and German Patent Document No. 10 2012 206 554.7, filed Apr. 20, 2012, the disclosures of which are expressly incorporated by reference herein.

DESCRIPTION

The present invention relates to the use of a stable indoline-nitroxide radical as a stabilizer for resin mixtures and reactive resin mortars each based on radically curable compounds and/or as inhibitor to adjust the pot life of resin mixtures and reactive resin mortars. Furthermore, the present invention relates to a reactive resin mixture that is stable in storage as well as a reactive resin mortar that is stable in storage, each based on radically curable compounds as well as their use as binders for the chemical bonding technology.

The use of reactive resin mortars based on radical curable compounds as binders has long been known. In the field of fastening technology, the use of resin mixtures as organic binders for chemical fastening technology, for example, as dowel compositions, has been successful. These are composite materials, which are fabricated as multicomponent systems, wherein one component, i.e., the A component, contains the resin mixture and the other component, the B component, contains the curing agent. Vinyl ester resins and unsaturated polyester resins are often used as radically curable compounds, in particular for the chemical fastening technology. Other conventional ingredients such as organic or inorganic additives, for example, fillers, accelerators, stabilizers, inhibitors, thixotropy agents, stabilizing agents, thickeners and solvents, including reactive solvents (reactive diluents) and dyes may be present in one and/or the other component. Then by mixing the two components, the curing reaction, i.e., polymerization is initiated by formation of free radicals and the resin is cured to form the duromer.

For a targeted use, it is important in the meantime to delay the polymerization reaction to the extent that the mixture still remains processable for a certain amount of time, which is also referred to as the pot life or gel time, after the resin component has been mixed with the hardener component, so that the mixture can be introduced into a borehole, for example, and a fastening means can be introduced before the mixture begins to cure (polymerize). This is achieved by adding compounds, i.e., the so-called inhibitors, that are capable of capturing the free radicals formed when the two components are mixed, i.e., the so-called inhibitors. In order for the pot life which is adjusted for a given system to also remain stable for a longer period of time after storage of the resin component, the inhibitor effect should not change during storage due to autoxidation of the compounds, for example, or due to influences involving the system, so that there is no unwanted change in the curing properties of the mixture.

One effect which can negatively influence the curing properties and the properties of the cured mortar composition is the instability of the resin and/or of the resin mixture during storage, which can result in partial and/or complete gelation, i.e., polymerization of the resin. To prevent this, compounds, so-called stabilizers, which should suppress premature polymerization of the resin, are added to the resin mixtures and/or to the reactive resin mortars. This is done by capturing the free radicals that are formed.

One compound may therefore be either just a stabilizer or just an inhibitor or both, i.e., both a stabilizer and an inhibitor. In the latter case, the effect depends to a significant extent on the amount of compound used. Addition in small amounts serves as a stabilizer in general and is often unable to influence the pot life, whereas with a sufficiently large quantity, the compound may also have an inhibiting and/or retarding effect in addition to the stabilizing effect. A distinction is made here for a better differentiation between stabilizer and inhibitor.

In order to compounds to be suitable as stabilizers and inhibitors for resin mixtures and reactive resin mortars, they must meet various criteria such as the influence on the efficiency of the cured resin compound as well as imparting stability in storage under various conditions and the adjustability of the pot life to a predetermined reasonable extent. However, none of the compounds used today can fulfill the aforementioned criteria under all (use) conditions. Therefore the compounds are selected as a function of the desired criteria and the desired effect.

For stabilization against premature polymerization, resin mixtures and reactive resin mortars usually contain stabilizers such as hydroquinone, substituted hydroquinones, phenothiazine, benzoquinone, or tert-butylpyrocatechol as described in EP 1935860 A1 or EP 0965619 A1, for example. These stabilizers impart a storage stability of several months to the reactive resin mortar but this usually applies only in the presence of oxygen dissolved in the reactive resin mortar. If stored in the absence of air, polymerization will begin after just a few days. For this reason, it has been necessary in the past to package these reactive resin mortars in such a way that they come in contact with air.

DE 19531649 A1, for example, describes the stabilization of reactive resin mortars based on radically curable compounds to prevent premature polymerization in the absence of air using stable nitroxide radicals, also known as N-oxyl radicals, namely piperidinyl-N-oxyl and tetrahydropyrrole-N-oxyl. Therefore, 4-hydroxy-2,2,6,6-tetramethylpiperidine-N-oxyl (also known as tempol) is currently often used for stabilization when the reactive resin mortar is stored in the absence of air. Tempol has the advantage that its pot life can also be adjusted in this way.

However, the inventors have observed that the storage stability of resin mixtures and reactive resin mortars stabilized with tempol containing acids or traces of acids is reduced in comparison with the storage stability of those containing little or no acids or traces of acids. Furthermore, a gel time drift has been observed in some cases with reactive resin mortars, which contain acids or traces of acids and whose pot life has been adjusted with tempol to a certain value. Larger quantities of acid in particular can have a negative effect on the storage stability and the gel time stability.

The object of the present invention is now to provide resin mixtures that are stable in storage and reactive resin mortars containing same, each based on radically curable compounds which have a sufficiently long storage stability in particular in air-tight packaging even in the presence of acids and whose pot life can be adjusted reliably.

This object is achieved by the fact that a stable nitroxide radical having an indoline structure is used as the stabilizer for reactive resin mixtures and reactive resin mortars containing same and/or inhibitors to adjust the pot life of resin mixtures and reactive resin mortars containing same, each based on radically curable compounds.

Meanings used in the sense of the invention:

"Base resin": the pure curing and/or curable compound which cures by itself or with reactive reagents such as curing agents, accelerators and the like (not present in the base resin), by polymerization; the curable compounds may be monomers, dimers, oligomers and prepolymers;

"Radically curable compound": the compound contains functional groups that undergo free radical polymerization;

"Resin masterbatch": the product of production of the base resin after synthesis (without isolating the base resin) which may contain reactive diluents, stabilizers and catalysts;

"Resin mixture": a mixture of the resin masterbatch and accelerators plus stabilizers and optionally additional reactive diluents; this term is used as equivalent to the term "organic binder";

"Reactive resin mortar": a mixture of resin mixture and organic and inorganic additives for which the term "A component" is used as equivalent;

"Reactive resin compound": a ready-to-process curing mixture of a reactive resin mortar with the required curing agent; this term is used as equivalent to the term "mortar compound";

"Curing agent": substances which cause the polymerization (curing) of the base resin;

"Hardener": a mixture of curing agents, optionally stabilizers, solvent(s) and optionally organic and/or inorganic additives; this term is used as equivalent to the term "B component";

"Reactive diluent": liquid or low viscosity base resins which dilute other base resins, the resin masterbatch or the resin mixture and thereby impart the required viscosity to their application, containing functional groups capable of reaction with the base resin and becoming a predominant part of the cured compound (mortar) in the polymerization (curing);

"Accelerator": a compound capable of accelerating the polymerization reaction (curing) which serves to accelerate the formation of the radical initiator;

"Stabilizer": a compound capable of inhibiting the polymerization reaction (curing) which serves to prevent the polymerization reaction and thus to prevent unwanted premature polymerization of the radically polymerizable compound during storage; these compounds are usually used in such small amounts that the pot life is not affected;

"Inhibitor": likewise a compound capable of inhibiting, i.e., retarding the polymerization reaction (curing), serving to delay the polymerization reaction immediately after addition of the curing agent; these compounds are usually used in amounts such that the pot life is affected;

"Storage stability" and/or "stable in storage": meaning that a resin mixture or a reactive resin mortar (without the addition of a curing agent or a hardener) does not undergo either gelation or an increase in viscosity during storage;

"Pot life" (also "gel time"): in general the maximum period of time within which a system consisting of multiple components should be processed after mixing; more precisely this corresponds to the period of time within which the temperature of the reactive resin compound increases from +25° C. to +35° C. after it has been prepared;

"Gel time drift" (for a certain period of time, for example, 30 or 60 days): refers to the phenomenon whereby when the curing takes place at a different point in time than the reference standard point in time of curing, for example 24 hours after preparation of the reactive resin and/or the reactive resin compound, the observed pot life differs from the point in time of the reference.

Reactive resin mortars are usually prepared by placing the starting compounds required to produce the base resin in a reactor optionally together with catalysts and solvents, in particular reactive diluents, and reacting them. After the end of the reaction and optionally already at the start of the reaction, compounds for the storage stability, namely the stabilizers, are added to the reaction mixture. This yields the so-called resin masterbatch. Accelerators for curing of the base resin and compounds for adjusting the pot life, the inhibitors and optionally other solvents in particular reactive diluents are optionally added to the resin masterbatch to obtain the resin mixture. As mentioned above, the compounds for adjusting the pot life (stabilizers) may be the same or different compounds (inhibitors). This resin mixture is combined with inorganic additives to adjust various properties, such as the rheology and the concentration of the base resin, so that the reactive resin mortar is obtained. The reactive resin mortar is poured into glass cartridges, cartridges or into film bags, which are optionally air-tight, depending on the intended application.

Thus a resin mixture preferably contains at least one radically curable compound, reactive diluent, accelerator, stabilizers and optionally additional inhibitors to adjust the pot life and a reactive resin mortar in addition to the resin mixture already described, organic and/or inorganic additives, but inorganic additives are especially preferred, as described in greater detail below.

The invention is based on the idea of making available resin mixtures and reactive resin mortars prepared from them, in particular those containing traces of acids and/or inorganic additives, having an increased stability in storage without requiring any complex and expensive purification of the respective components such as precursor compounds, e.g., the polymeric methylene diphenyl diisocyanate (pMDI) or the reactive diluents.

The inventors have discovered that the stability of resin mixtures and reactive resin mortars containing same in storage, in particular those containing traces of acid due to the production process, can be greatly improved if a stable nitroxide radical having an indoline backbone structure is used as the stabilizer. Resin mixtures and reactive resin mortars based on radically curable compounds whose stability in storage is greatly improved in comparison with those stabilized with tempol can be produced in this way.

One particularly advantageous aspect of the indoline-nitroxide radical used here is that it makes it possible to adjust the pot life of a resin mixture and that of a reactive resin mortar containing same to a predetermined extent.

The use of indoline-nitroxide radicals as stabilizers for unsaturated and/or vinyl aromatic monomers such as ethylene in radically controlled polymerization or copolymerization of ethylene under high pressure or methacrylic acid or derivatives thereof is known from EP 1951772 A1 and US 2008/274074 A1, for example, but the unsaturated and/or vinyl aromatic monomers or comonomers described here are not complex systems that contain a larger molecule than radically curable compounds and, on the other hand, are filled with inorganic additives which give a basic reaction.

Inorganic additives which give a strongly basic reaction, for example, cement are frequently used in systems with inorganic fillers such as those used as dowel compounds for chemical fastening of anchoring elements, for example. Furthermore, the radically curable compounds are not processed, i.e., isolated but instead the resin masterbatch is used to produce the resin mixtures and the reactive resin mortars.

Those skilled in the art are aware of the fact that the additives contained in the resin masterbatch as well as the additional additives and fillers added to the resin masterbatch can have a substantial influence on the stability of the base resin, i.e., its tendency to premature polymerization without the addition of curing agents during storage. The additives and fillers as well as their concentrations may produce a different effect, which cannot be predicted. Therefore, the systems must be reevaluated and their properties must be adjusted when one component is replaced by another even if a similar reactivity is to be expected.

One first subject matter of the present invention is the use of a stable indole-nitroxide radical as a stabilizer and/or inhibitor for a resin mixture or a reactive resin mortar containing same, each based on radically curable compounds.

Indoline-nitroxide suitable according to the invention are selected from compounds of general formula (I)

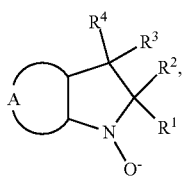

in which

A is a hydrocarbon group, which forms an aromatic, optionally substituted ring with the two carbon atoms to which it is bound, wherein the substituents may constitute one or more optionally substituted aromatic or aliphatic (partially) condensed rings;

$R^1$, $R^2$, $R^3$ and $R^4$ may be the same or different and each, independently of the others, may represent a hydrogen atom, an alkyl group, an alkenyl group, an aryl group or an aralkyl group, —OH, —$OR^5$, —COOH, —$COOR^6$ or —CN, where the groups may optionally be substituted; or $R^1$ and $R^2$ may be as defined above and $R^3$ and $R^4$=X, where X is O or $NR^7$ and $R^5$, $R^6$ and $R^7$ each represents an optionally substituted alkyl, alkenyl, aryl or aralkyl group.

The term "alkyl group" refers to a linear or branched $C_1$-$C_{20}$ alkyl group or a $C_3$-$C_{20}$ cycloalkyl group such as, for example, a methyl, ethyl, n-propyl, isopropyl, n-butyl, n-dodecanyl, isobutyl, tert-butyl, cyclopropyl or cyclohexyl group.

The term "aryl group" refers to an aromatic group with 6 to 20 carbon atoms such as, for example, a phenyl, naphthyl, tolyl or biphenyl group.

The term "aralkyl group" denotes an aryl group as defined above which is substituted with at least one alkyl group as defined above such as, for example, a 2-phenylethyl, tert-butylbenzyl or benzyl group.

The term "alkenyl group" denotes a linear or branched $C_2$-$C_{20}$ alkenyl group or cyclic $C_3$-$C_{20}$ alkenyl group such as, for example, a vinyl, allyl or cyclohexenyl group.

The term "substituted" means that the respective group contains one or more substituents, where the substituents may be a halogen atom, an alcohol, ether, amine, carboxylic acid, ester, nitrile, amide, nitro, thiol, thioester, silyl, phosphinic or phosphoryl group.

Preferably at least one of $R^1$ and $R^2$ is a group with a molecular weight of more than 15 and/or $R^3$ and $R^4$ may equal X, where X is defined as indicated above; and/or $R^1$ is an aryl moiety such as a phenyl or mesityl and $R^2$ is a $C_1$-$C_4$ alkyl moiety such as methyl, ethyl, isopropyl, n-butyl, an aryl moiety such as phenyl or a benzyl or allyl moiety.

The compound of general formula (I) is especially preferably an indole derivative of the general formula (II)

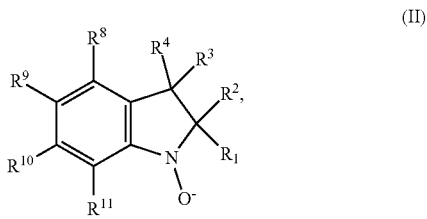

wherein $R^1$, $R^2$, $R^3$, $R^4$ are defined as indicated above;

$R^8$ to $R^{11}$ may be the same or different and each denotes, independently of one another, hydrogen or a group as defined for $R^1$ to $R^4$; or $R^8$ and $R^9$ together or $R^9$ and $R^{10}$ together or $R^{10}$ and $R^{11}$ together form an aliphatic or aromatic ring.

The compound of general formula (II) is most especially preferably 2,3-dihydro-2,2-diphenyl-3-(phenylimino)-1H-indole-1-oxyl nitroxide.

Another subject matter of the invention is a resin mixture prepared by using a stable indole-nitroxide radical as described above as the stabilizer and/or inhibitor. The function of the indole-nitroxide radical, i.e., its use as a stabilizer or inhibitor, depends on the concentration in which it is used.

Such a resin mixture has a greater storage stability in comparison with a resin mixture containing a stable nitroxide radical of the piperidinyl-N-oxyl type or tetrahydropyrrole-N-oxyl type as a stabilizer.

The indole-nitroxide radical is used in an amount of 0.02 to 1 wt % preferably 0.025 to 0.3 wt % and especially preferably 0.03 to 0.06 wt %, based on the resin mixture as a stabilizer, i.e., without having a significant effect on the pot life of the resin mixture and/or of the reactive resin mortar.

The indole-nitroxide radical is used in an amount of 0.05 to 2 wt %, preferably 0.1 to 1.5 wt %, especially preferably 0.1 to 1 wt %, based on the resin mixture, as an inhibitor, i.e., to adjust the pot life to a predetermined extent.

It is clear to those skilled in the art that the mechanism of action of the indole-nitroxide radical used here, i.e., whether it acts only as a stabilizer to prevent premature gelation of the resin or additionally acts as an inhibitor to adjust the pot life after mixing the resin component and the hardener component, depends not only on the amount in which it is used but also on whether and if so in which amount an accelerator is used and in which amount the radical initiator is used. The smaller the amount of accelerator and/or of the radical initiator, the sooner, i.e., with smaller amounts added, the indole-nitroxide radical affects the pot life. Accordingly there is no precisely limit between the stabilizing effect and the inhibitor effect. However, those skilled in the art can determine the amount of indole-nitroxide radical beyond which the pot life can be influenced and can do so without any major effort for a given system having a known accelerator and initiator concentration.

According to the invention, the resin mixture may also contain other compounds which impart stability in storage to the resin mixture in addition to or instead of the indole-nitroxide radicals. Such compounds are sufficiently well known and can be selected by those skilled in the art by a suitable method.

In one embodiment, the resin mixture may additionally contain 0.005 to 3 wt %, preferably 0.01 to 1 wt %, based on the resin mixture, of another inhibitor, in particular a phenolic inhibitor, such as phenols, quinones or phenothiazines, e.g., 2,6-di-tert-butyl-p-cresol, but also catechols, such as pyrocatechol and derivatives thereof to adjust the pot life and the reactivity (cf. EP 1 935 860 A1).

According to the invention, ethylenically unsaturated compounds, cyclic monomers, compounds with carbon-carbon triple bonds and thiol-yn/en resins, such as those with which those skilled in the art are familiar, are suitable as radically curable compounds.

Of these compounds, the group of ethylenically unsaturated compounds is preferred, comprising styrene and derivatives thereof, (meth)acrylates, vinyl esters, unsaturated polyesters, vinyl ethers, allyl ethers, itaconates, dicyclopentadiene compounds and unsaturated fats, of which unsaturated polyester resins and vinyl ester resins are suitable in particular and are described in the patent applications EP 1 935 860 A1, DE 195 31 649 A1, WO 02/051903 A1 and WO 10/108939 A1, for example. Vinyl ester resins are the most preferred because of their hydrolytic stability and excellent mechanical properties.

Examples of suitable unsaturated polyesters that may be used according to the invention are divided into the following categories as classified by M. Malik et al. in *J. M. S. Rev. Macromol. Chem. Phys.*, C40 (2 and 3), pp. 139-165 (2000):

(1) Ortho resins: These are based on phthalic anhydride, maleic anhydride or fumaric acid and glycols such as 1,2-propylene glycol, ethylene glycol, diethylene glycol, triethylene glycol, 1,3-propylene glycol, dipropylene glycol, tripropylene glycol, neopentyl glycol or hydrogenated bisphenol A;

(2) Iso resins: These are produced from isophthalic acid, maleic anhydride or fumaric acid and glycols; these resins may contain larger amounts of reactive diluents than the ortho resins;

(3) Bisphenol A fumarates: These are based on ethoxylated bisphenol A and fumaric acid;

(4) HET acid resins (hexachloroendomethylene tetrahydrophthalic acid resins): these are resins produced from anhydrides or phenols that contain chlorine/bromine in the synthesis of unsaturated polyester resins.

In addition to these classes of resins, the so-called dicyclopentadiene resins (DCPD resins) may also be differentiated as unsaturated polyester resins. The class of DCPD resins is obtained either by modification of one of the types of resins listed above by Diels-Alder reaction with cyclopentadiene or as an alternative they may be obtained by an initial reaction of a dicarboxylic acid, e.g., maleic acid with dicyclopentadienyl and then by a second reaction, the standard method of synthesis of an unsaturated polyester resin, where the latter is called a DCPD maleate resin.

The unsaturated polyester resin preferably has a molecular weight Mn in the range of 500 to 10,000 Dalton, more preferably in the range of 500 to 5000 and even more preferably in the range of 750 to 4000 (according to ISO 13885-1). The unsaturated polyester resin has an acid value in the range of 0 to 80 mg KOH/g resin, preferably in the range of 5 to 70 mg KOH/g resin (according to ISO 2114-2000). If a DCPD resin is used as an unsaturated polyester resin, the acid value preferably amounts to 0 to 50 mg KOH/g resin.

In the sense of the present invention, vinyl ester resins are oligomer, prepolymers or polymers having at least one (meth)acrylate terminal group, so-called (meth)acrylate functionalized resins, which also includes urethane (meth) acrylate resins and epoxy (meth)acrylates.

Vinyl ester resins having unsaturated groups only in the terminal position, are obtained for example, by reacting epoxy oligomers or polymers (e.g., bisphenol A-digylcidyl ether, epoxides of the phenol-novolac type or epoxide oligomers based on tetrabromobisphenol A) with, for example, (meth)acrylic acid or (meth)acrylamide. Preferred vinyl ester resins include (meth)acrylate functionalized resins and resins obtained by reaction of an epoxide oligomer or polymer with methacrylic acid or methacrylamide, preferably with methacrylic acid. Examples of such compounds are known from the patent applications U.S. Pat. No. 3,297,745 A, U.S. Pat. No. 3,772,404 A, U.S. Pat. No. 4,618,658 A, GB Patent 2 217 722 A1, DE 37 44 390 A1 and DE 41 31 457 A1.

Particularly suitable and preferred vinyl ester resins include (meth)acrylate functionalized resins obtained, for example, by reaction of difunctional and/or higher functional isocyanates with suitable acryl compound optionally with the participation of hydroxy compounds containing at least two hydroxyl groups such as those described in DE 3940309 A1 for example.

Isocyanates that can be used include aliphatic (cyclic or linear) and/or aromatic di- or higher functional isocyanates and/or prepolymers thereof. Using such compounds serves to increase the wetting capacity and thus to improve the adhesion properties. Aromatic di- or higher functional isocyanates and/or prepolymers thereof are preferred, an aromatic di- or higher functional prepolymers are especially preferred. For example, toluylene diisocyanate (TDI), diisocyanatodiphenylmethane (MDI) and polymeric diisocyanatodiphenylmethane (pMDI) may be mentioned for increasing the chain stiffening and hexane diisocyanate (HDI) and isophorone diisocyanate (IPDI) which improve flexibility can be mentioned, but polymer diisocyanatodiphenylmethane (pMDI) is most especially preferred.

Suitable acyl compounds include acrylic acid and acrylic acids with substituents on the hydrocarbon moiety such as methacrylic acid, hydroxyl group-containing esters of (meth)acrylic acid with polyvalent alcohols, pentaerythritol tri(meth)acrylate, glycerol di(meth)acrylate such as, for example, trimethylolpropane di(meth)acrylate, neopentyl glycol mono(meth)acrylate. Acrylic and/or methacrylic acid hydroxyalkyl esters such as hydroxyethyl (meth)acrylate, hydroxypropyl (meth)acrylate, polyoxyethylene (meth) acrylate, polyoxypropylene (meth)acrylate especially since such compounds serve to provide stearic hindrance for the saponification reaction.

Suitable hydroxy compounds that may optionally be used include di- or higher valent alcohols such as the derivatives of ethylene and/or propylene oxide such as ethanediol, di- and/or triethylene glycol, propanediol, dipropylene glycol, other diols such as 1,4-butanediol, 1,6-hexanediol, neopentyl glycol, diethanolamine also bisphenol A and/or F and/or their ethoxylation/propoxylation and/or hydrogenation and/ or halogenation products, higher valent alcohols such as glycerol, trimethylol propane, hexanetriol and pentaerythritol, polyethers containing hydroxyl groups, for example, oligomers of aliphatic or aromatic oxiranes and/or higher cyclic ethers such as ethylene oxide, propylene oxide, styrene oxide and furan, polyethers containing aromatic structural units in the main chain such as, for example, bisphenol A and/or F, polyesters based on the aforementioned alcohols and/or polyethers containing hydroxyl groups and dicarboxylic acids and/or their anhydrides such as adipic acid, phthalic acid, tetra- and/or hexahydrophthalic acid, HET acid, maleic acid, fumaric acid, itaconic acid, sebacic acid and the like. Hydroxy compounds with automatic structural units are especially preferred for chain stiffening of the resin, hydroxy compounds containing unsaturated structural units such as fumaric acid to increase the crosslinking density, branched and/or star-shaped hydroxy compounds, in particular tri- and/or higher valent alcohols and/or polyethers and/or polyesters containing their structural units, branched and stellate urethane (meth)acrylates to achieve a lower viscosity of the resins and/or solutions thereof in reactive diluents and with a higher reactivity and crosslinking density.

The vinyl ester resin preferably has molecular weight Mn in the range of 500 to 3000 Dalton, more preferably 500 to 1500 Dalton (according to ISO 13885-1). The vinyl ester resin has an acid value in the range of 0 to 50 mg KOH/g resin, preferably in the range of 0 to 30 mg KOH/g resin (according to ISO 2114-2000).

All these resins that can be used according to the invention may be modified by methods with which those skilled in the art are familiar in order to achieve, for example, lower acid numbers, hydroxide numbers or anhydride numbers or they can be made more flexible by introducing flexible units into the basic structure and the like.

In addition the resin may also contain other reactive groups that can be polymerized with a radical initiator such as peroxides, for example, reactive groups which are derived from itaconic acid, citraconic acid and allylic groups and the like.

The use of the indole-nitroxide radical in a resin mixture whose curable component contains traces of acid such as mineral acid or carboxylic acid is especially suitable such as those formed in the synthesis of the radically curable compound or a precursor compound thereof, for example.

The base resins are used in an amount of 20 to 100 wt %, preferably 25 to 65 wt %, based on the resin mixture.

In a preferred embodiment of the invention, the resin mixture contains at least one reactive diluent for the curable ingredient (a), wherein the reactive diluent(s) is/are added in an amount of 0 to 80 wt %, preferably 30 to 60 wt %, based on the resin mixture. Suitable reactive diluents are described in EP 1 935 860 A1 and DE 195 31 649 A1.

Fundamentally other conventional reactive diluents may also be used either alone or in mixture with (meth)acrylic acid esters, for example, styrene, a-methylstyrene, alkylated styrenes such as tert-butylstyrene, divinylbenzene, vinyl ether and/or allyl compounds.

According to another preferred embodiment of the invention, the resin mixture is present in a pre-accelerated form; in other words it contains at least one accelerator for the curing agent. Preferred accelerators for the curing agent include aromatic amines and/or salts of cobalt, manganese, tin, vanadium or cerium. Accelerators that have proven to be especially advantageous include anilines, p- and m-toluidines and xylidines which may be substituted symmetrically or asymmetrically with alkyl or hydroxyalkyl moieties. For example, the following preferred accelerators can be mentioned: N,N-dimethylaniline, N,N-diethylaniline, N,N-diethylolaniline, N-ethyl-N-ethylolaniline, N,N-diisopropanol-p-toluidine, N,N-diisopropylidene-p-toluidine, N,N-dimethyl-p-toluidine, N,N-diethylol-p-toluidine, N,N-diethylol-m-toluidine, N,N-diisopropylol-m-toluidine, N,N-bis(2-hydroxyethyl)toluidine, N,N-bis(2-hydroxyethyl)xylidine, N-methyl-N-hydroxyethyl-p-toluidine, cobalt octoate, cobalt naphthenate, vanadium(IV) acetylacetonate and vanadium(V)-acetyl acetonate.

According to the invention the accelerator and/or the accelerator mixture is added in an amount of 0.05 to 5 wt %, preferably 1 to 2 wt %, based on the resin mixture.

The inventive resin mixtures may be used to prepare reactive resin mortars for the chemical fastening technology. The reactive resin mortars prepared according to the invention are characterized by a particularly good stability in storage—even in the absence of atmospheric oxygen.

Another subject matter of the invention is therefore a reactive resin mortar which contains the usual inorganic additives such as fillers, thickeners, thixotropy agents, non-reactive solvents, agents to improve flow properties and/or wetting agents in addition to the resin mixture. The fillers are preferably selected from the group consisting of particles of quartz, quartz sand, corundum, calcium carbonate, calcium sulfate, glass and/or organic polymers of a wide range of sizes and shapes, for example, as sand or powder, in the form of beads or hollow beads but also in the form of fibers of organic polymers such as, for example, polymethyl methacrylate, polyester, polyamide or in the form of microbeads of polymers (bead polymers). The globular inert substances (spherical shape) are preferred and have a definite strengthening effect.

Suitable thickeners or thixotropy agents include those based on silicates, bentonite, laponite, pyrogenic silica, polyacrylates and/or polyurethanes.

Another subject matter of the invention is a polycomponent mortar system comprising at least two (spatially) separate components A and B. The polycomponent mortar system comprises two or more separate interconnected and/or concatenated containers, wherein the one contains the reactive resin mortar and the other contains the hardener which may optionally be filled with organic and/or inorganic additives.

The polycomponent mortar system may be present in the form of a capsule or a cartridge or a film bag. When the inventive reactive resin mortars are used as intended, component A and component B are mixed together by being expressed from the capsules or cartridges or from bags, either under the influence of mechanical forces or by gas pressure, preferably with the help of a static mixer, through which the ingredients are passed and introduced into the borehole, after which the devices to be solidified, such as threaded anchor rods or the like are introduced into the borehole that has been charged with the curing reactive resin and then adjusted accordingly.

Preferred hardeners are organic peroxides that are stable in storage. Dibenzoyl peroxide and methyl ethyl ketone peroxide as well as tert-butyl perbenzoate, cyclohexanone peroxide, lauroyl peroxide and cumene hydroperoxide as well as tert-butylperoxy-2-ethylhexanoate are especially suitable.

The peroxides are used in amounts of 0.2 to 10 wt %, preferably 0.3 to 3 wt %, based on the reactive resin mortar.

The hardeners are expediently stabilized by inert fillers, where quartz sand is preferred.

In a particularly preferred embodiment of the inventive multicomponent mortar system, the A component also contains, in addition to the curable compounds, a hydraulically setting or polycondensable inorganic compound, in particular cement, and the B component also contains water in addition to the curing agent. Such hybrid mortar systems are described in detail in DE 42 31 161 A1, where the A component preferably contains cement, for example, Portland cement or aluminate cement as the hydraulically setting or polycondensable inorganic compound, wherein cements having little or no iron oxide content are particularly preferred. Gypsum as such or in mixture with cement may also be used as the hydraulically setting inorganic compound.

The A component may also comprise as the polycondensable inorganic compound, silicatic, polycondensable compounds in particular substances containing soluble dissolved and/or amorphous silicon dioxide.

The great advantage of the invention is that it is no longer necessary to inspect the components of the resin composition such as the curable compound or its precursors for traces of acid such as mineral acid or to subject them to an expensive and complex cleaning which may be necessary in some cases. There is a significant increase in the stability of reactive resin mortars during storage in particular.

The following examples are presented to further illustrate the present invention.

EXEMPLARY EMBODIMENTS

A. Determination of Stability in Storage

EXAMPLE 1 AND COMPARATIVE EXAMPLE 1

1a) Production of Resin Masterbatch 688 g hydroxypropyl methacrylate is mixed with 0.5 mL dibutyltindilaurate. At 60° C. 311 g polymeric methylene diphenyl diisocyanate (pMDI; Desmodur VL R 20®, maximum acidity value: 200 ppm HCl; Bayer) is added slowly by drops whereupon the internal temperature rises to 85° C. After the end of the dropwise addition, stirring is continued until the residual isocyanate content has dropped to less than 0.2%.

1b) Production of Resin Mixture 698 g 1,4-butanediol dimethacrylate as the reactive diluent and 39 g bis(hydroxyethyl)-p-toluidine as the accelerator are added to the resulting resin masterbatch and the resin is stabilized with 9.8 g 2,6-di-tert-butyl-p-cresol and 0.7 g 2,3-dihydro-2,2-diphenyl-3-(phenyl-imino)-1H-indole-1-oxyl nitroxide as the stabilizer. By adding one or more aromatic amines, the pot life of the resin is set at approx. 7 min.

For comparison (Comparative Example 1; V1) instead of the 0.7 g 2,3-dihydro-2,2-diphenyl-3-(phenylimino)-1H-indole-1-oxyl nitroxide, 0.7 g 4-hydroxy-2,2,6,6-tetramethylpiperidine-N-oxyl as the stabilizer.

Determination of the Stability of the Resin Mixtures in Storage

To simulate prolonged storage time, the samples were subjected to a thermostability test at an elevated temperature. In each case 20 mL of the resin sample (resin mixture) is welded in an oxygen-proof film (11×17 cm) and then heated at a regulated 80° C. The sample is observed to ascertain whether gelation occurs during storage. The resulting perceptible increase in viscosity (consistency in gelation: ranging from similar to liquid honey to similar to gummy bears (gelatinous)) provides information about the thermal stability. Two independent double determinations were performed in each case. As a result the maximum time t at which the sample is not yet gelled is obtained, which yields the value for the stability in storage.

The resin mixture stabilized with 2,3-dihydro-2,2-diphenyl-3-(phenylimino)-1H-indole-1-oxyl nitroxide (Example 1) was stable for at least 248 hours and the resin mixture (V1) stabilized with 4-hydroxy-2,2,6,6-tetramethylpiperidine-N-oxyl was stable for at least 48 hours.

As shown by these results, the time until gelation of a resin containing mineral acid can be increased by a factor of approximately five by addition of 2,3-dihydro-2,2-diphenyl-3-(phenylimino)-1H-indole-1-oxyl nitroxide as stabilizer.

EXAMPLE 2 AND COMPARATIVE EXAMPLE 2

2) Production of Reactive Resin Mortar

The resin mixtures prepared as described above (Example 1, Comparative Example 1) were mixed with 30 to 45 wt % quartz sand, 15 to 25 wt % cement and 1 to 5 wt % pyrogenic silica in a dissolver to from a homogeneous mortar composition.

The stability of the reactive resin mortars in storage was determined as done with the resin mixtures.

Gelation occurred after about 68 hours in the case of the reactive resin mortar stabilized with 2,3-dihydro-2,2-diphenyl-3-(phenylimino)-1H-indole-1-oxyl nitroxide (Example 2) and after about 47 hours in the case of the reactive resin mortar stabilized with 4-hydroxy-2,2,6,6-tetramethylpiperidine-N-oxyl (Comparative Example 2, V2).

It has thus been demonstrated that it is also possible to increase the stability in storage of resin mixtures containing inorganic fillers, i.e., the reactive resin mortars on the basis of reactive resins containing traces of acid and thereby prolong the storage time.

B. Determination of the Pot Life and the Compound Stresses at Failure

EXAMPLES 3 AND 4 AS WELL AS COMPARATIVE EXAMPLES 3 AND 4

3a) Production of the Reactive Resin Mortar (A-1)

To the resin masterbatch according to Example 1a) were added 698 g 1,4-butanediol dimethacrylate as the reactive diluent and 19.9 g N,N-bis(hydroxyethyl)-p-toluidine and 7.5 g 2,3-dihydro-2,2-diphenyl-3-(phenylimino)-1H-indole-1-oxyl nitroxide. A free-flowing preparation was prepared by mixing this with 50 g pyrogenic silica, 340 g alumina cement and 700 g quartz sand.

3b) Production of the Hardener Component (B)

To produce the hardener component 40 g dibenzoyl peroxide, 250 g water, 25 g pyrogenic silica, 5 g laminar silicate and 700 g quartz powder of a suitable grain size distribution were combined in the dissolver to form a homogeneous composition.

4) Production of Another Reactive [Resin] Mortar (A-2)

622 g of a commercial vinyl ester resin based on bisphenol A was combined with 510 g hydroxyethyl methacrylate and 568 g ethylene glycol dimethacrylate and 19.9 g N,N-bis(hydroxyethyl)-p-toluidine and 8.5 g 2,3-dihydro-2,2-diphenyl-3-(phenylimino)-1H-indole-1-oxyl nitroxide were added. A pasty composition was prepared by blending with 50 g pyrogenic silica, 340 g alumina cement and 700 g quartz sand.

5) Comparative Example 3 (V3)

For the comparison a reactive resin mortar according to Example 3a) was produced, except that instead of the 7.5 g 2,3-dihydro-2,2-diphenyl-3-(phenylimino)-1H-indole-1-oxyl nitroxide, 5.3 g 4-hydroxy-2,2,6,6-tetramethylpiperidine-N-oxyl was used.

6) Comparative Example 4 (V4)

As a further comparison, a reactive resin mortar according to Example 3a) was prepared except that instead of the 7.5 g 2,3-dihydro-2,2-diphenyl-3-(phenylimino)-1H-indole-1-oxyl nitroxide, 5.4 g 2,6-di-tert-butyl-p-cresol was used.

Resin components (A-1) and (A-2) and also the hardener component (B) were mixed together in a volume ratio of 3:1, yielding mortar compositions.

Determination of the Pot Life of the Mortar Compositions

Determination of the pot life of mortar compositions obtained in this way was done using a commercial apparatus (GELNORM® Gel Timer) at a temperature of 25° C. To do so, the components were mixed and heated with regulation in a silicone bath at 25° C. immediately after being mixed and the temperature of the sample was measured. The sample itself is in a test tube which is placed in an air blanket, and lowered into a silicone bath for temperature regulation.

The temperature of the sample was plotted as a function of time. The analysis was performed according to DIN 16945, Sheet 1 and DIN 16916. Pot life is the time when a temperature rise of 10K is achieved, namely here from 25° C. to 35° C.

Results of the pot life determinations are listed in Table 1.

Determination of the Composite Stresses at Failure

To determine the composite stresses at failure of the cured compound, threaded anchor rods M12, which were doweled into boreholes in concrete with a diameter of 14 mm and a borehole depth of 72 mm using the reactive resin mortar compositions of the examples and comparative examples. The average failure loads were determined by central extraction of the threaded anchor rods. Three threaded anchor rods were doweled into place in each case and their load values were determined after 24 hours of curing. The failure composite stresses (N/mm²) determined in this way are listed as the mean value in the following Table 1.

Various borehole conditions and/or curing conditions were tested as listed below.

| Test condition | Comment |
| --- | --- |
| Reference | well cleaned impact drilled borehole, curing at room temperature (+20° C.) |
| −10° C. | reference holes, setting and curing at an underground temperature of −10° C. |
| +40° C. | reference holes, setting and curing at an underground temperature of +40° C. |

The results of the determination of the composite stresses at failure are also listed in Table 1.

TABLE 1

Results of the determination of the pot life and composite stresses at failure.

| Example | | 3 | 4 | V3 | V4 |
| --- | --- | --- | --- | --- | --- |
| Pot life (25° C.) [min] | | 5:30 | 5:00 | 5:00 | 6:00 |
| Stability in storage according to example 2 | | >48 h | >48 h | <24 h | <24 h |
| Composite stress at failure [N/mm²] | −10° C. | 10.7 | 14.3 | 19.5 | 18.2 |
| | +20° C. | 20.7 | 21.3 | 20.9 | 21.0 |
| | +40° C. | 23.2 | 23.5 | 21.5 | 22.9 |

It is apparent from this table that it is possible with 2,3-dihydro-2,2-diphenyl-3-(phenylimino)-1H-indole-1-oxyl nitroxide to adjust the pot life of a mortar composition in a targeted manner. In addition it has been shown that the composite stresses at failure are within the range of those of mortar compositions whose pot life was set at 5:00 min or 6:00 min using the known inhibitors 4-hydroxy-2,2,6,6-tetramethylpiperidine-N-oxyl and 2,6-di-tert-butyl-p-cresol under reference conditions and at +40° C.

In storage, the same influence of oxygen on the pot life stability of the reactive resin mortars inhibited with 2,3-dihydro-2,2-diphenyl-3-(phenylimino)-1H-indole-1-oxyl nitroxide was also observed in the reactive resin mortars inhibited with 4-hydroxy-2,2,6,6-tetramethylpiperidine-N-oxyl. This means that reactive resin mortars according to the invention stored in the absence of oxygen exhibit a gel time drift whereas reactive resin mortars according to the invention stored in the presence of oxygen do not.

It has thus been demonstrated that it has been possible to increase the stability in storage of resin mixtures as well as resin mixtures containing inorganic resin fillers based on reactive resins containing traces of oxygen and thereby significantly prolong the storage time. Furthermore, it has been shown that it is also possible to adjust the pot life using indole-nitroxide radicals.

The invention claimed is:

1. A method of stabilizing and/or inhibiting resin mixture or a reactive resin mixture comprising:

using a stable nitroxide radical as a stabilizer and/or inhibitor for a resin mixture or a reactive resin mixture based on radically curable compounds, wherein the radically curable compound is obtained by reacting di- and/or higher functional isocyanates with suitable acryl compounds, optionally with the participation of hydroxy compounds containing at least two hydroxyl groups each, and wherein the stable nitroxide radical is selected from compounds of general formula (I)

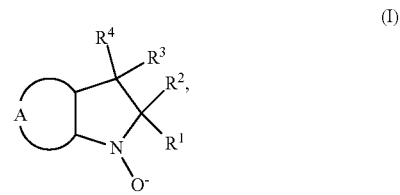

(I)

wherein

A is a hydrocarbon group which form an aromatic, optionally substituted ring with the two carbon atoms to which it is bound, wherein the substituents may constitute one or more optionally substituted aromatic or aliphatic condensed rings;

$R^1$, $R^2$, $R^3$ and $R^4$ may be the same or different and each denotes independently of the others a hydrogen atom, an alkyl group, an alkenyl group, an aryl group or an aralkyl group, —OH, —OR$^5$, —COOH, —COOR$^6$ or —CN;

$R^3$ and $R^4$ =X, where X is O or NR$^7$ and $R^5$, $R^6$, $R^7$ each represents an alkyl, alkenyl, aryl or aralkyl group.

2. The method according to claim 1, wherein in formula (I) at least one of $R^1$ and $R^2$ denotes a group with a molecular weight greater than 15 and/or $R^3$ and $R^4$=X wherein X is defined as given above and/or $R^1$ denotes an aryl moiety such as phenyl or mesityl and $R^2$ denotes a $C_1$-$C_4$ alkyl moiety such as methyl, ethyl, isopropyl, n-butyl, an aryl moiety such as phenyl, a benzyl or allyl moiety.

3. The method according to claim 2, wherein the stable nitroxide radical is selected from compounds of general formula (II)

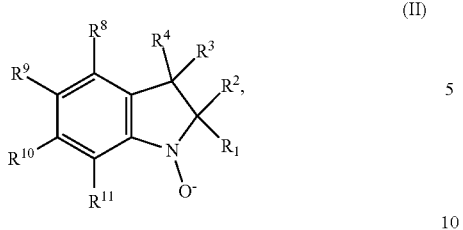 (II)

wherein $R^1$, $R^2$, $R^3$, $R^4$ are defined in claim 1;

$R^8$ to $R^{11}$ may be the same or different and each denotes, independently of one another, water or a group as defined for $R^1$ to $R^4$; or $R^8$ and $R^9$ or $R^9$ and $R^{10}$ or $R^{10}$ and $R^{11}$ are joined together to form an aliphatic or aromatic cycle.

4. The method according to claim 3, wherein the stable nitroxide radical is 2,3-dihydro-2,2-diphenyl-3-(phenylimino)-1H-indole-1-oxyl nitroxide.

5. The method according to claim 1, wherein the reactive resin mortar contains at least one inorganic additive, selected from the group consisting of fillers, thickeners, thixotropy agents, nonreactive solvents, agents to improve flowability and wetting agents.

6. The method according to claim 5, wherein the at least one inorganic additive is cement and/or quartz sand.

* * * * *